United States Patent
Nanrudaiyan et al.

(10) Patent No.: US 9,355,798 B2
(45) Date of Patent: May 31, 2016

(54) SYSTEM AND METHOD FOR QUENCHING AN ARC

(71) Applicant: General Electric Company, Schenectady, NY (US)

(72) Inventors: Nalini Nanrudaiyan, Bangalore (IN); Linda Yvonne Jacobs, Barkhamsted, CT (US); Rajendra Naik, Bangalore (IN); Adnan Kutubuddin Bohori, Bangalore (IN); Marcin Piotr Lagiewka, Bielsko-Biala (PL); Raheel Abdulla, Bangalore (IN)

(73) Assignee: General Electric Company, Niskayuna, NY (US)

( * ) Notice: Subject to any disclaimer, the term of this patent is extended or adjusted under 35 U.S.C. 154(b) by 83 days.

(21) Appl. No.: 14/464,721

(22) Filed: Aug. 21, 2014

(65) Prior Publication Data
US 2016/0055999 A1     Feb. 25, 2016

(51) Int. Cl.
*H01H 33/08* (2006.01)
*H02H 3/08* (2006.01)

(52) U.S. Cl.
CPC ...... *H01H 33/08* (2013.01); *H02H 3/08* (2013.01)

(58) Field of Classification Search
CPC .................................. H01H 33/08; H02H 3/08
USPC ........................................................ 361/102
See application file for complete search history.

(56) References Cited

U.S. PATENT DOCUMENTS

| | | | |
|---|---|---|---|
| 2,599,242 A | 6/1952 | Favre | |
| 2,648,742 A * | 8/1953 | Edmunds | H01H 9/36 218/151 |
| 3,133,175 A * | 5/1964 | Kuhn | H01H 9/44 218/26 |
| 3,728,503 A * | 4/1973 | Clausing | H01H 33/08 218/149 |
| 3,728,506 A * | 4/1973 | Heehler | H01H 9/345 218/149 |
| 3,830,994 A | 8/1974 | Netzel | |
| 4,295,021 A * | 10/1981 | Asinovsky | H01H 33/08 218/34 |
| 4,375,021 A * | 2/1983 | Pardini | H01H 9/36 218/25 |
| 4,443,673 A | 4/1984 | Sember | |
| 4,697,055 A | 9/1987 | Walter et al. | |
| 4,737,607 A | 4/1988 | Bernard et al. | |
| 4,963,849 A * | 10/1990 | Kowalczyk | H01H 9/342 218/35 |

(Continued)

FOREIGN PATENT DOCUMENTS

DE     7027838 U     12/1971
EP     0048171 A1    3/1982

(Continued)

OTHER PUBLICATIONS

Shokichi Ito et al.,"3-D finite element analysis of magnetic blowout forces acting on the arc in molded case circuit breakers", IEEE Transactions on Magnetics, Vol. 33, No. 2, Mar. 1997, pp. 2053-2056.

(Continued)

*Primary Examiner* — Scott Bauer
(74) *Attorney, Agent, or Firm* — Seema S. Katragadda

(57) ABSTRACT

An arc quenching system is presented. The arc quenching system includes a mounting structure, a plurality of movable arc chute plates mounted on the mounting structure, and a motion delivery unit mechanically coupled to the mounting structure. The motion delivery unit is configured to impart at least one of a rotation motion and a vibration motion to one or more movable arc chute plates of the plurality of movable arc chute plates.

22 Claims, 3 Drawing Sheets

(56) References Cited

U.S. PATENT DOCUMENTS

| | | |
|---|---|---|
| 5,001,313 A | 3/1991 | LeClercq et al. |
| 5,347,097 A | 9/1994 | Bolongeat-Mobleu et al. |
| 5,761,025 A * | 6/1998 | Iversen .................. H02B 1/14 200/50.27 |
| 6,232,570 B1 | 5/2001 | Castonguay et al. |
| 6,262,642 B1 | 7/2001 | Bauer |
| 2013/0112657 A1 | 5/2013 | Degda et al. |

FOREIGN PATENT DOCUMENTS

| | | |
|---|---|---|
| EP | 0146424 B1 | 1/1988 |
| JP | H11329134 A | 11/1999 |
| JP | 2000182486 A | 6/2000 |
| JP | 2001195958 A | 7/2001 |

OTHER PUBLICATIONS

Jung-Hun Kwon et al. "An Influence of New Arc Quenching Methods for Improving the Interrupting Capacity of Low Voltage Circuit Breaker", 1st International Conference on Electric Power Equipment—Switching Technology, IEEE Xplore, Oct. 23-27, 2011, pp. 642-646.

European Search Report and Opinion issued in connection with corresponding EP Application No. 15180155.2 on Mar. 2, 2016.

* cited by examiner

SYSTEM AND METHOD FOR QUENCHING AN ARC

BACKGROUND

Embodiments of the present disclosure relate to protection of electrical circuits, and more particularly to a system and method for quenching of an arc in the electrical circuits.

Protecting electrical devices from fault conditions such as an over-current condition or an over-temperature condition is of utmost importance while configuring home and industrial electrical setups. Faults in a main power supply or faults resulting from short circuit conditions may result in the malfunctioning of the electrical devices and/or damage the electrical devices. Therefore, it is desirable to interrupt the current flowing through the electrical devices on occurrence of such faults in order to protect the electrical devices.

Currently, during the fault condition a device such as a circuit breaker is employed to interrupt the current flowing through the electrical devices connected to the circuit breaker. Use of the circuit breaker is more prevalent than use of a fuse due to reusability of the circuit breaker. The fuse once burnt needs to be replaced in order to resume supply of the current. The circuit breaker may be used to sense the over-current condition, the over-temperature condition, and a manual interruption of the current. Once the fault condition is detected, the circuit breaker is used to interrupt the current flowing through the electrical devices that are connected to the circuit breaker.

In general, the circuit breaker typically includes a fixed contact and a moving contact detachably coupled to the fixed contact. Under normal operating conditions, such coupling of the fixed contact and the moving contact allows the current to flow through the circuit breaker. On occurrence of a fault such as the over-current condition and/or the over-temperature condition, the moving contact separates from the fixed contact to interrupt the flow of the current. Additionally, manual interruption of the current flowing through the circuit breaker may also result in separation of the moving contact from the fixed contact. However, the separation of the moving contact from the fixed contact may generate an arc between the moving contact and the fixed contact as the current still continues to flow.

The presence of this arc between the moving contact and the fixed contact leads to undesirable results. For example, the presence of the arc allows the current to flow for a certain period of time even after the separation of the fixed contact and the moving contact. Also, the arc may re-strike due to increased temperature and presence of highly ionized air between the fixed contact and the moving contact. This re-striking of the arc also allows the current to flow through the electrical devices. Therefore, it is desirable to mitigate the arc expeditiously.

One such solution to mitigate the arc is to use an arc quenching system such as an arc chute. Currently available arc chutes include multiple stationary arc chute plates made of conductive materials such as metals. These arc chute plates are held together proximate to the fixed contact and the moving contact. Magnetic and/or gaseous forces produced due to the arc and the presence of the arc chute plates force the arc to move into the arc chute. Consequently, the arc is divided between the arc chute plates. This division of the arc allows the arc to be broken and diminished.

In the process of dividing the arc, the arc chute plates may get damaged due to erosion of the arc chute plates caused by hot spots where the arc strikes the arc chute plates. Therefore, the lifetime of the arc chute and hence the lifetime of the circuit breaker is reduced. Moreover, the erosion of the arc chute plates results in a formation of metal vapor near the fixed contact and the moving contact. The metal vapor may increase the conductivity of plasma between the fixed contact and the moving contact. Therefore, in the conventional arc quenching systems where the arc chute plates are stationary, the possibility of arc re-striking severely diminishes the performance of the circuit breaker.

BRIEF DESCRIPTION

In accordance with aspects of the present specification, an arc quenching system is presented. The arc quenching system includes a mounting structure, a plurality of movable arc chute plates mounted on the mounting structure, and a motion delivery unit mechanically coupled to the mounting structure. The motion delivery unit is configured to impart at least one of a rotation motion and a vibration motion to one or more movable arc chute plates of the plurality of movable arc chute plates to quench an arc.

In accordance with another aspect of the present specification, an arc quenching system is presented. The arc quenching system includes a mounting structure, a plurality of movable arc chute plates mounted on the mounting structure, and a housing configured to enclose at least the mounting structure and the plurality of movable arc chute plates. The housing includes a window configured to channelize a pressurized gas to impart at least one of a rotation motion or a vibration motion to one or more movable arc chute plates of the plurality of movable arc chute plates.

In accordance with another embodiment of the present specification, a circuit breaker is presented. The circuit breaker includes a fixed contact, a moving contact detachably coupled to the fixed contact, and an arc quenching system. The arc quenching system includes a plurality of movable arc chute plates arranged proximate to the fixed contact and the moving contact, wherein one or more movable arc chute plates of the plurality of movable arc chute plates are configured to rotate, vibrate, or both, in response the generation of an arc to facilitate quenching of the arc.

In accordance with yet another embodiment of the present specification, a method for quenching an arc in a circuit breaker connected in an electrical path, where the circuit breaker includes a moving contact detachably coupled to a fixed contact is presented. The method includes determining one or more fault conditions. The method also includes enabling a separation of the moving contact from the fixed contact in response to the detection of the one or more fault conditions. Furthermore, the method includes imparting a rotation motion, a vibration motion, or both to one or more movable arc chute plates of a plurality of movable arc chute plates upon separation of the moving contact from the fixed contact to quench the arc.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

The specification may be best understood with reference to the detailed figures and description set forth herein. Various embodiments are described hereinafter with reference to the figures. However, those skilled in the art will readily appreciate that the detailed description given herein with respect to these figures is just for explanatory purposes as the method and the system extend beyond the described embodiments.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Presently available circuit breakers include an arc chute having multiple stationary arc chute plates. Such arc chutes are prone to erosion of the arc chute plates and arc re-striking. The shortcomings of the currently available circuit breakers may be circumvented via use of an exemplary arc quenching system. The arc quenching system includes a plurality of arc chute plates that is configured to rotate, vibrate, or both. The arc quenching system, in accordance with aspects of the present specification, may overcome the shortcomings of the currently available circuit breakers such as erosion and arc re-striking.

Figure 1:
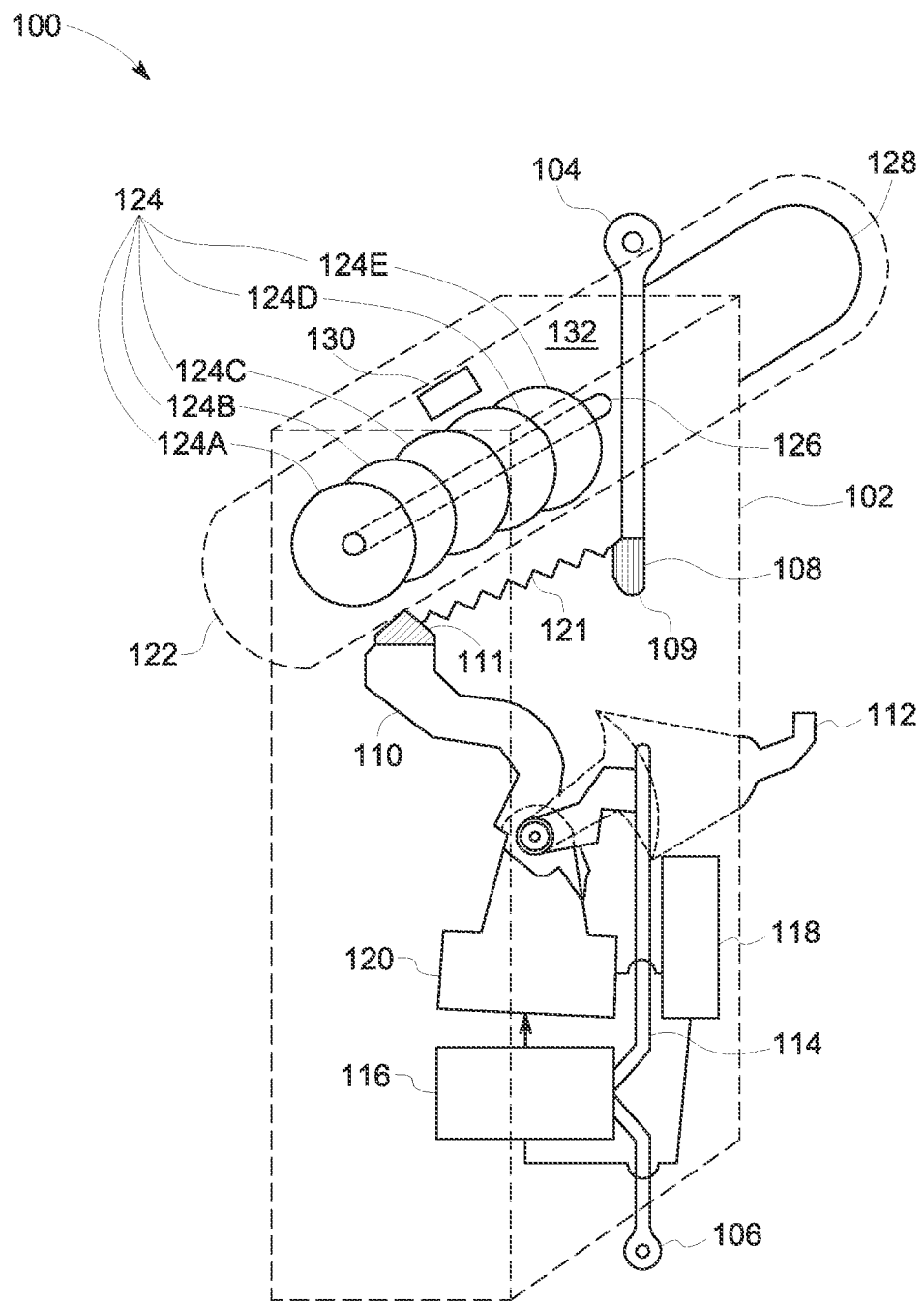
FIG. 1 is a perspective view of a circuit breaker including an exemplary arc quenching system, in accordance with aspects of the present specification.

FIG. 1 is a perspective view of a circuit breaker 100, in accordance with aspects of the present specification. The circuit breaker 100 includes a housing 102, an input power terminal 104, and an output power terminal 106. Furthermore, the circuit breaker 100 includes one or more of a fixed contact 108, a moving contact 110, a lever 112, a connector 114, a current sensing unit 116, a control unit 118, and an actuator unit 120. In addition, the circuit breaker 100 may include an exemplary arc quenching system 122. The housing 102 may be configured to enclose one or more of the fixed contact 108, the moving contact 110, the arc quenching system 122, the lever 112, the connector 114, a current sensing unit 116, the control unit 118, and the actuator unit 120. In one embodiment, the arc quenching system 122 may include a plurality of movable arc chute plates such as arc chute plates 124A, 124B, 124C, 124D, and 124E (hereinafter collectively referred to as arc chute plates 124), and a mounting structure 126. In some embodiments, the arc quenching system 122 may also include a motion delivery unit 128.

The input power terminal 104 and the output power terminal 106 may be used to connect the circuit breaker 100 in an electrical path. In one example, a first terminal of a mains supply may be connected to the input power terminal 104 and a second terminal of the mains supply may be connected to the output power terminal 106. In one embodiment, connections of the input power terminal 104 and the output power terminal 106 may be such that the circuit breaker 100 is connected in series with the mains supply. Further, one or more electrical devices (not shown), such as, but not limited to, a television, a refrigerator, a fan, or an air-conditioner may also be connected in the electrical path. The circuit breaker 100, under normal operating conditions, allows a current to flow through the electrical path. In one example, the normal operating conditions may correspond to a situation when the current flowing through the circuit breaker 100 is below a first threshold value. In another embodiment, the normal operating conditions may correspond to a situation when a temperature being sensed by the circuit breaker 100 is below a second threshold value. In yet another embodiment, the normal operating conditions may correspond to a situation when the lever 112 remains in a first position thereby ensuring that the moving contact 110 is detachably coupled to the fixed contact 108.

Furthermore, in one embodiment, the input power terminal 104 and the output power terminal 106 may be in the form of a lug. Also, the input power terminal 104 and the output power terminal 106 may be formed using any metal. More particularly, the input power terminal 104 and the output power terminal 106 may be formed using metals such as, but not limited to, copper, aluminum, alloys, or combinations thereof.

The input power terminal 104 may be coupled to the fixed contact 108. Although, the fixed contact 108 is depicted as having a linear design, other shapes of the fixed contact 108 are also contemplated in accordance with aspects of the present specification. Further, the moving contact 110 may be detachably coupled to the fixed contact 108 thereby allowing the current to flow through the electrical path. In one embodiment, the fixed contact 108 may include a contact region 109 that remains in contact with a corresponding contact region 111 of the moving contact 110 under the normal operating conditions. In one embodiment, the fixed contact 108 and the moving contact 110 may be formed using any metal. By the way of example, the fixed contact 108 and the moving contact 110 may be formed using metals such as, but not limited to, copper, aluminum, alloys, or combinations thereof.

The moving contact 110 may be coupled to the current sensing unit 116 via the connector 114. Moreover, the output power terminal 106 may be coupled to the current sensing unit 116. Therefore, under the normal operating conditions, the current from the input power terminal 104 flows through the fixed contact 108, the moving contact 110, the connector 114, and the current sensing unit 116 to the output power terminal 106. In one embodiment, the connector 114 may be formed using any metal. By the way of example, the connector 114 may be formed using metals such as, but not limited to, copper, aluminum, alloys, or combinations thereof.

In one embodiment, the circuit breaker 100 may be configured to protect the electrical devices from a fault condition such as an over-current condition. It may be noted that the terms 'fault condition' and 'fault' may be used interchangeably. In such applications, the current sensing unit 116 may be configured to detect the current flowing through the circuit breaker 100. In one embodiment, in order to detect the current, the current sensing unit 116 may include a suitable arrangement of a Rogowski coil, a current transformer, or a combination thereof. In one example, the Rogowski coil or the current transformer may be used to detect the current flowing through the connector 114 based on electromagnetic induction. A current induced in the Rogowski coil or the current transformer may be measured to detect the current flowing through the circuit breaker 100.

In another embodiment, the circuit breaker 100 may also include the control unit 118 electrically coupled to the current sensing unit 116. The control unit 118 may be configured to receive the current detected by the current sensing unit 116. The control unit 118 may also be configured to determine an occurrence of the over-current condition based on the detected current. In one example, the control unit 118 may be configured to compare the detected current with the first threshold value in order to determine the occurrence of the over-current condition. The control unit 118 may be configured to determine that the circuit breaker 100 is operating under the normal operating condition if the detected current is below the first threshold value. However, if the detected current is above the first threshold value, the control unit 118 may be configured to determine that the circuit breaker 100 is operating in the over-current condition. Upon detection of the over-current condition, the control unit 118 may be configured to generate a control signal. This control signal may be communicated to the actuator unit 120. In one embodiment, the first threshold value may be representative of a maximum value of a current that may be allowed to flow through the circuit breaker 100. The first threshold value may be configured at the time of manufacture of the control unit 118.

The control unit 118 may be implemented using various hardware elements including, but not limited to, a suitable arrangement of one or more of a general purpose processor, a micro controller, a memory, integrated circuits that may facilitate the comparison operation, and the like. The hardware elements may be disposed on a printed circuit board. The functionality of the control unit 118 may be imparted using software or a combination of the hardware elements and the software. Moreover, the control unit 118 may be positioned inside the housing 102 or outside the housing 102 without limiting the scope of the present specification.

Furthermore, in one embodiment, the actuator unit 120 may be configured to receive the control signal from the control unit 118. In response to the control signal, the actuator unit 120 may be configured to operate the moving contact 110 such that the moving contact 110 is separated from the fixed contact 108. In order to operate the moving contact 110, in one embodiment, the actuator unit 120 may include a spring (not shown). The spring may be configured to remain charged, for example, in an elongated form, when the moving contact 110 is coupled to the fixed contact 108. Upon receipt of the control signal from the control unit 118, the spring may be discharged. The discharging of the spring allows the separation of the moving contact 110 from the fixed contact 108. The separation of the moving contact 110 from the fixed contact 108 results in a break in the flow of the current through the electrical path, thereby protecting the electrical devices.

Moreover, in one embodiment, the control unit 118 may be an optional unit. In such a configuration, the current sensing unit 116 may include a solenoid (not shown) electrically coupled in series with the connector 114. In this configuration, the current that flows through the connector 114 also flows through the solenoid. The circuit breaker 100 may also include a plunger (not shown) arranged within the solenoid, where the plunger is mechanically coupled to the moving contact 110. The solenoid may be designed such that when a value of the current flowing through the solenoid exceeds the first threshold value, a sufficient amount of electromagnetic force is applied on the plunger such that the plunger is displaced from a current position. Such a displacement of the plunger results in the separation of the moving contact 110 from the fixed contact 108. The separation of the moving contact 110 from the fixed contact 108 results in a break in the flow of the current through the electrical path, thereby protecting the electrical devices.

In some embodiments, the circuit breaker 100 may also be configured to protect the electrical devices from a fault such as an over-temperature condition. The over-temperature condition may correspond to a situation where the heat/temperature produced due the flow of the current inside the circuit breaker 100 exceeds the second threshold value. In order to detect the over-temperature condition, the circuit breaker 100 may also include a bi-metallic strip (not shown). In one embodiment, the bi-metallic strip may be electrically coupled between the output power terminal 106 and the current sensing unit 116. In another embodiment, the bi-metallic strip may be electrically coupled between the current sensing unit 116 and the connector 114. Additionally, the bi-metallic strip may also be mechanically coupled to the moving contact 110 via a latch (not shown). The latch may be coupled to the moving contact 110 through the plunger. In one example, the latch may be formed using an insulating material.

The bi-metallic strip may be formed using two metals with different temperature coefficients. The flow of current through the bi-metallic strip, results in an increase in the temperature of the bi-metallic strip. The increase in the temperature of the bi-metallic strip causes bending of the bi-metallic strip. In one embodiment, the bending of the bi-metallic strip may be directly proportional to the temperature and hence to the amount of the current that flows through the bi-metallic strip. The bending of the bi-metallic strip due to the increased temperature also causes the displacement of the plunger via the latch. Such a displacement of the plunger results in the separation of the moving contact 110 from the fixed contact 108. The separation of the moving contact 110 from the fixed contact 108 results in a break in the flow of the current through the electrical path, thereby protecting the electrical devices.

Furthermore, the current flowing through the circuit breaker 100 may also be interrupted by manually operating the lever 112. The lever 112 may be mechanically coupled to the moving contact 110. The lever 112 may be operated to position the lever 112 at a second position that is different from the first position. The first position may be representative of the lever 112 being in an "up" position. In the first position, the lever 112 ensures that the moving contact 110 is coupled to the fixed contact 108, thereby allowing the current to flow. The lever 112 may be pulled down to interrupt the flow of current. In the second position such as a pulled down position, the lever 112 enables the separation of the moving contact 110 from the fixed contact 108.

Separation of the moving contact 110 from the fixed contact 108 due to any of the over-current condition, the over-temperature condition, or the manual interruption of the current may cause formation of an arc 121 between the moving contact 110 and the fixed contact 108. For example, an abrupt interruption of the current due the separation of the moving contact 110 from the fixed contact 108 may cause heating of the air between the moving contact 110 and the fixed contact 108 as the current continues to flow. This heating of the air may in turn cause ionization of the surrounding air thereby creating plasma between the fixed contact 108 and the moving contact 110. The ionized air may act as a conductor and allow the current to flow from fixed contact 108 to the moving contact 110. This flow of the current due to the ionized air may be representative of the arc 121. Formation of the arc 121 is an undesirable situation and hence it is desirable to expeditiously mitigate the arc 121.

According to one aspect of the present disclosure, in order to mitigate the arc 121, the circuit breaker 100 may include the arc quenching system 122. As previously noted, in one embodiment, the arc quenching system 122 may include the chute plates 124 and the mounting structure 126. The arc chute plates 124 are mounted on the mounting structure 126. The mounting structure 126 may be in the form of a bar, a rod, a cylinder, or combinations thereof. In some embodiments, the arc quenching system 122 may also include the motion delivery unit 128. The motion delivery unit 128 may include a motor, a spring, one or more gears, or combinations thereof. The arc chute plates 124 may be located proximate to the fixed contact 108 and the moving contact 110. Further, one or more of the arc chute plates 124 may be configured to rotate, vibrate, or both. In one embodiment, the arc chute plates 124 and the mounting structure 126 may be enclosed by the housing 102 and the motion delivery unit 128 may be disposed outside the housing 102. In another embodiment, the arc chute plates 124, the mounting structure 126, and the motion delivery unit 128 may be enclosed within the housing 102.

In one embodiment, the arc chute plates 124 may be formed using any conductive material including, but not limited to, stainless steel or copper. In another embodiment, the arc chute plates 124 may be formed using a ferromagnetic material such as mild steel. Although the embodiment of FIG. 1 depicts the arc quenching system 122 as including five arc chute plates 124, use of a greater or lower number of arc chute plates is also envisioned. Further, although the arc chute plates 124 are depicted as having a circular shape, arc chute plates of any shape may be utilized without departing from the scope of the present specification. In one embodiment, each of the arc chute plates 124 may include a hole. In one embodiment, the holes may be located at the center of each of the arc chute plates 124. In another embodiment, the holes may be located away from the centers of the arc chute plates 124.

In one embodiment, the mounting structure 126 may be inserted through the holes in the arc chute plates 124 for aiding the mounting of the arc chute plates 124 thereon. Moreover, the mounting structure 126 may be formed using any insulating material that is resistant to the arc 121. An example of such an insulating material includes a glass bulk molding compound (BMC) having a glass content of 10% or more. It may also be noted that other types of insulating materials may also be used to form the mounting structure 126 without departing from the scope of the present specification. In one embodiment, one end of the mounting structure 126 may be coupled to the motion delivery unit 128 while the other end of the mounting structure 126 may be movably supported by the housing 102.

Furthermore, in one embodiment, following the separation of the moving contact 110 from the fixed contact 108, the motion delivery unit 128 may be configured to impart at least one of a vibrating motion or a rotary motion to the mounting structure 126 thereby vibrating and/or rotating the arc chute plates 124. By the way of example, subsequent to the separation of the moving contact 110 from the fixed contact 108, the control unit 118 may be configured to transmit the control signal to the motion delivery unit 128. In response to the control signal, the motion delivery unit 128 may be configured to impart at least one of the vibration motion or the rotation motion to the mounting structure 126 to vibrate and/or rotate the arc chute plates 124. In another embodiment, the control unit 118 may be configured to apply or turn on a driving power to the motion delivery unit 128 to vibrate and/or rotate the arc chute plates 124.

Additionally, in one embodiment, the motor of the motion delivery unit 128 may be configured to impart the rotation motion to the mounting structure 126 to rotate the arc chute plates 124. In another embodiment, the motion delivery unit 128 and the mounting structure 126 may be configured to selectively rotate one or more of the arc chute plates 124.

Also, the driving power for running the motor may be derived from an external battery (not shown). In another embodiment, the driving power for running the motor may be directly derived from a voltage induced in a secondary coil of the current transformer utilized in the current sensing unit 116. In yet another embodiment, a capacitor may be charged using the voltage induced in the secondary coil of the current transformer. The energy stored in the capacitor may then be used to drive the motor.

In another embodiment, the spring in the motion delivery unit 128 may be configured to be in an energized form. For example, the energized form of the spring may include a stretched condition. Also, one end of the spring may be coupled to the mounting structure 126 and another end of the spring may be mechanically coupled to the moving contact 110 and/or the lever 112. Under the normal operating conditions, the spring may be maintained in an elongated form. Upon separation of the moving contact 110 from the fixed contact 108, the spring may be configured to release its energy in the form of vibrations of the mounting structure 126. In another embodiment, the vibrations and/or rotation of the mounting structure 126 may be facilitated by a suitable arrangement of a motor and one or more gears without departing from the scope of the present specification.

With continuing reference to FIG. 1, in yet another embodiment, the arc chute plates 124 may be configured to self-rotate. In such a configuration, one or both ends of the mounting structure 126 are movably supported by the housing 102. For example, holes may be drilled on opposite sides of the housing 102 so as to movably support the mounting structure 126 that has the arc chute plates 124 disposed thereon. A window 130 may be provided in the housing 102. More particularly, the window 130 may be provided on a top surface 132 of the housing 102. The window 130 may also be provided on other side surfaces of the housing 102 that are proximate to the arc chute plates 124 without departing from the scope of the present specification. Occurrence of the arc 121 causes heating of the surrounding air and produces pressurized gas/air. The window 130 may be configured to channelize a pressurized gas to impart at least one of a rotation motion or a vibration motion to one or more of the plurality of movable arc chute plates. The pressurized gas may be released from the housing 102 via the window 130 thereby resulting in the rotation of the arc chute plates 124. In this embodiment, the arc chute plates 124 are configured to self-rotate using the pressurized gas/air. It may be noted that this embodiment obviates the need of for the motion delivery unit 128, thereby resulting in a simplified design of the arc quenching system 122.

In accordance with further aspect of the present specification, one or more of the arc chute plates 124 may be configured to self-rotate. Accordingly, for each of the one or more of the arc chute plates 124 that is configured to self-rotate, the diameter of the corresponding hole may be designed such that the diameter of the hole is greater than an outer diameter of the mounting structure 126. The non-self-rotating arc chute plates may be fixedly mounted on the mounting structure 126. Consequently, the release of the pressurized gas from the window 130 enables the rotation of the one or more of the arc chute plates 124 having diameters greater than the outer diameter of the mounting structure 126. Furthermore, in some embodiments, at least one of the arc chute plates 124 may be configured to rotate in a clockwise direction, while the other arc chute plates may be configured to rotate in an anticlockwise direction. In some embodiments of the invention, such rotations of the arc chute plates 124 in opposing directions may result in a speedy quenching of the arc 121.

In one embodiment, in order to aid the self-rotation of the arc chute plates 124, the arc chute plates 124 may be designed to have aerodynamic shapes. Various exemplary arc chute plates will be discussed with respect to FIGS. 2-4.

Rotation and/or vibration of the arc chute plates 124, either imparted by the motion delivery unit 128 or self-actuated, may create turbulence in the air flow inside the housing 102. Velocity of the air flow may increase in the proximity of the arc 121. Such an increase in the air flow velocity may enhance the heat transfer mechanism, thereby aiding faster arc interruption. Moreover, the rotating arc chute plates 124 may create an additional drag force on the arc 121. The additional drag force may in turn disturb the ionized air and hence decrease the duration of the arc 121. Furthermore, in one embodiment, since the arc chute plates 124 rotate, the position at which the arc 121 strikes each of the arc chute plates 124 continuously changes. Therefore, the rotating/vibrating arc chute plates 124 may not be affected with erosion at a single position, thereby increasing the life of the arc chute plates 124. Further, the faster interruption of the arc 121 results in a compact arc chamber, enhanced mechanical integrity, and higher short circuit handling capability. These factors may further result in significant cost reduction.

Furthermore, the arc quenching system 122 of the present specification is configured to continuously interrupt the arc 121 by the rotating and/or vibrating the arc chute plates 124. Moreover, an increase in the air flow velocity may also aid in lowering the overall temperate of the arc 121 and the temperature of the air surrounding the arc 121. Consequently, the possibility of re-striking of the arc 121 may substantially be reduced or eliminated.

A let through energy is representative of an energy that the circuit breaker 100 allows to flow between the fixed contact 108 and the moving contact 110 even after the fixed contact 108 and the moving contact 110 are separated. The let through energy is proportional to the square of the current that flows due to the formation of the arc 121. Therefore, it is highly desirable to minimize the let through energy. The speedy mitigation of the existing arc 121 and the reduction in the possibility or absence of re-striking of the arc 121 provided by the exemplary arc quenching system 122 may result in a lower value of the let through energy in comparison to that of a standard arc chute with stationary arc chute plates.

Although FIG. 1 illustrates the circuit breaker 100 configured for use with a single phase mains supply, similar features of the arc quenching system 122 may also be implemented in a circuit breaker configured for use with a multi-phase supply such as a three-phase supply without departing from the scope of the present specification.

Figure 2:
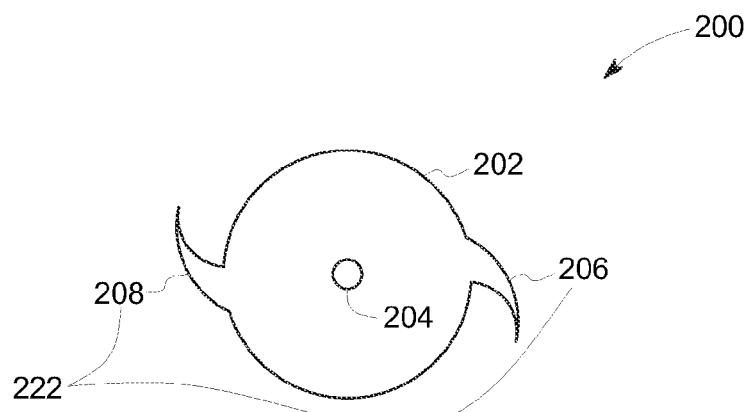
FIGS. 2-4 are diagrammatical illustrations depicting different embodiments of an arc chute plate for use in the exemplary arc quenching system of FIG. 1, in accordance with aspects of the present specification.
Figure 3:
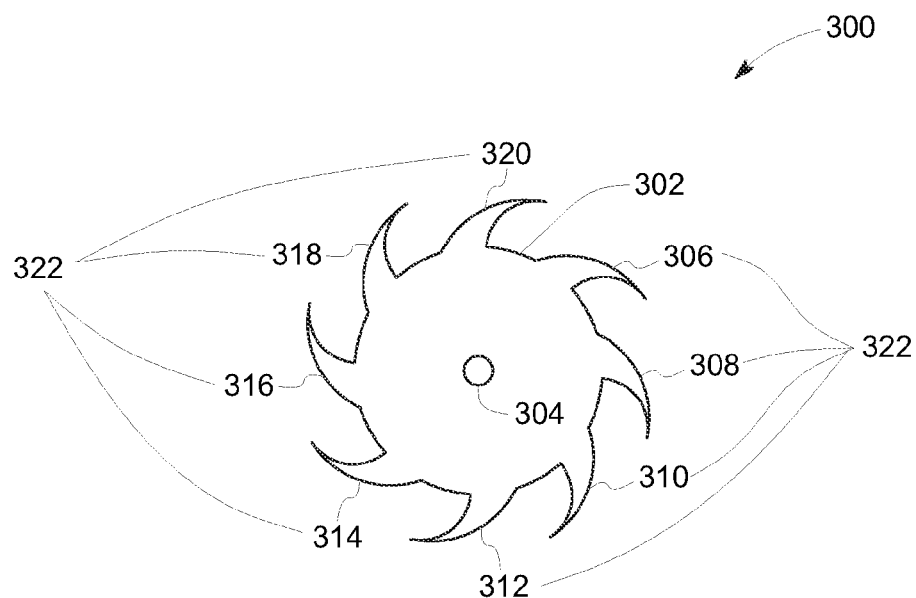
Figure 4:
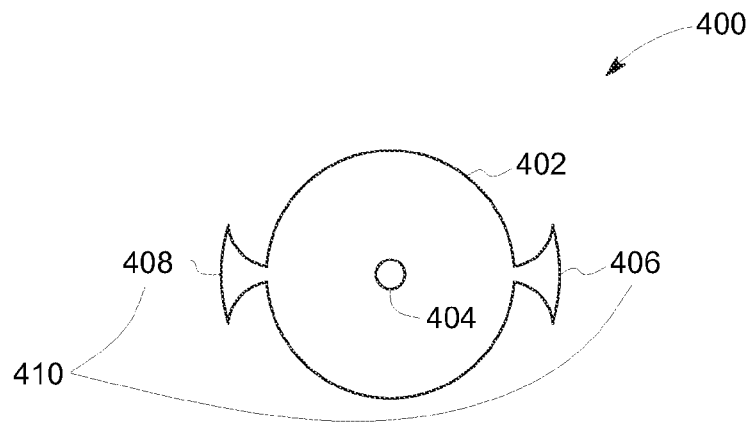

FIGS. 2-4 are diagrammatical illustrations depicting various embodiments 200, 300, and 400 of arc chute plates 202, 302, and 402, respectively, in accordance with aspects of the present specification. The arc chute plates 202, 302, and 402 may be representative of any of the arc chute plates 124 of FIG. 1. The arc chute plates 202, 302, and 402 are described with respect to the components of FIG. 1.

As depicted in FIG. 2, the arc chute plate 202 may include a hole 204. The hole 204 may allow for the insertion of a mounting structure such as the mounting structure 126 (see FIG. 1). As previously noted, the hole 204 is located at the center of the arc chute plate 202. In another embodiment, the hole 204 may be located at a location away from the center the arc chute plate 202. Moreover, the arc chute plate 202 may have one or more protrusions such as protrusions 206 and 208, hereinafter collectively referred to as protrusions 222.

The arc chute plate 302 of FIG. 3 may include a hole 304. The hole 304 may allow for the insertion of the mounting structure 126. In one embodiment, the hole 304 is located at the center of the arc chute plate 302. In another embodiment, the hole 304 may be located at a location away from the center of the arc chute plate 302. Furthermore, the arc chute plate 302 may have a plurality of protrusions such as protrusions 306, 308, 310, 312, 314, 316, 318, and 320, hereinafter collectively referred to as protrusions 322. In the examples of FIG. 2 and FIG. 3, FIG. 2 depicts the arc chute plate 202 having two such protrusions 222, whereas FIG. 3 depicts the arc chute plate 302 having more than two protrusions. For example, the arc chute plate 302 includes eight protrusions 322. It may be noted that the arc chute plates such as the arc chute plates 124 may include any number of protrusions and are not limited to the number of protrusions depicted in FIGS. 2-3.

The protrusions 222 or 322 may be configured to obstruct the flow of the pressurized gas that is generated in the housing 102 due to the occurrence of the arc 121. Consequent to the obstruction of the flow of the pressurized gas by the protrusions 222 and 322, the pressurized gas may force the arc chute plates 202 or 302 to rotate. The pressurized gas may then escape from the window 130 of FIG. 1. In one embodiment, the arc chute plates 202 or 302 may rotate in an anticlockwise direction. In another embodiment, the protrusions 222 and 322 may be designed such that the arc chute plate 202 and the arc chute plate 302 rotate in a clockwise direction.

Furthermore, in the example depicted in FIG. 4, the arc chute plate 402 may include protrusions 406 and 408 (hereinafter collectively referred to as protrusions 410) that are designed to have a shape that is different from the shapes of the protrusions 222 or 322. The protrusions 410 may also be configured to obstruct the flow of the pressurized gas that is generated due to the occurrence of the arc 121. Consequently, the pressurized gas may force the arc chute plate 402 to rotate. Also, as noted previously, the arc chute plate 402 may also include a hole 404. The hole 404 may allow for the insertion of the mounting structure 126. As previously noted, in one embodiment, the hole 404 is located at the center of the arc chute plate 402. In another embodiment, the hole 404 may be located at a location away from the center of the arc chute plate 402.

Figure 5:
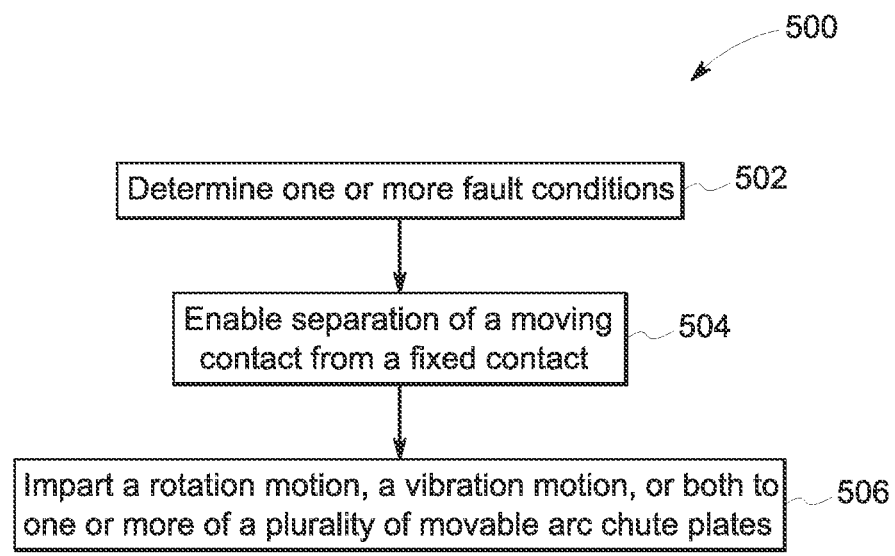
FIG. 5 is a flow chart depicting an example method for quenching an arc, in accordance with aspects of the present specification.

FIG. 5 is a flow chart 500 depicting an example method for quenching an arc, in accordance with aspects of the present specification. The flow chart 500 will be described in conjunction with FIG. 1. As previously noted, a circuit breaker such as the circuit breaker 100 is coupled in an electrical path. On occurrence of one or more fault conditions in the electrical path, an arc such as the arc 121 is generated inside an housing such as the housing 102 of the circuit breaker 100.

The circuit breaker 100 having the exemplary arc quenching system 122 is employed to expeditiously quench the arc 121 in the circuit breaker 100. The method starts at step 502, where one or more fault conditions in the electrical path are determined by the circuit breaker 100. In one embodiment, the fault conditions are determined by the control unit 118. Some examples of the fault conditions include an over-current condition, an over-temperature condition, and a manual interruption of a current flowing through an electrical path in which the circuit breaker 100 is connected.

In response to the determination of the one or more of the fault conditions, a separation of the moving contact 110 from the fixed contact 108 may be initiated, as indicated at step 504. In one embodiment, upon detection of the fault(s), the control unit 118 is configured to generate a control signal. The control unit 118 is configured to communicate the control signal to the actuator unit 120. In response to the control signal, the actuator unit 120 is configured to separate the moving contact 110 from the fixed contact 108. However, the separation of the moving contact 110 from the fixed contact 108 results in the generation of the arc 121. The generation of the arc 121 also results in formation of a pressurized gas inside the housing 102. It is desirable to expeditiously quench the arc 121. In accordance with aspects of the present specification, the exemplary arc quenching system 122 having the rotating/vibrating arc chute plates 124 is used to facilitate speedy quenching of the arc. Accordingly at step 506, one or more arc chute plates in the arc chute plates 124 may be rotated and/or vibrated.

The rotation and/or vibration of the arc chute plates 124 aid in faster quenching of the arc 121. In one embodiment, the control unit 118 is configured to communicate the control signal to the motion delivery unit 128. In response to the receipt the control signal, the arc chute plates 124 are rotated and/or vibrated by the motion delivery unit 128. In another embodiment, the arc chute plates 124 are configured to be self-rotated. In such a configuration, the housing 102 may include a window, such as the window 130. The window 130 is positioned to allow release of the pressurized gas from the housing 102 to the atmosphere outside the circuit breaker 100. The release of the pressurized gas from the window 130 enables the rotation of the arc chute plates 124. In such a configuration, the arc chute plates 124 may also be provided with the protrusions, such as, the protrusions 222, 322, and/or 410 of FIGS. 2-4.

The present specification has been described in terms of some specific embodiments. These embodiments are intended for illustration only, and should not be construed as being limiting in any way. Thus, it should be understood that modifications can be made thereto, which are within the scope of the present specification and the appended claims.

Embodiments of the system and method for quenching an arc facilitate faster quenching of the arc in the circuit breaker. Further, erosion of the arc chute plates is also reduced resulting in an increased life of the circuit breaker. Moreover, the faster interruption of the arc results in a compact arc chamber, enhanced mechanical integrity, and higher short circuit handling capability of the circuit breaker. These factors may further result in significant cost reduction. In addition, the possibility of re-striking of the arc may be substantially reduced or avoided. Such speedy mitigation of the existing arc may result in a lower value of the let through energy in comparison to that of a standard arc chute with stationary arc chute plates.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The invention claimed is:

1. An arc quenching system, comprising:
   a mounting structure;
   a plurality of movable arc chute plates mounted on the mounting structure; and
   a motion delivery unit mechanically coupled to the mounting structure and configured to impart at least one of a rotation motion and a vibration motion to one or more movable arc chute plates of the plurality of movable arc chute plates to quench an arc.

2. The arc quenching system of claim 1, wherein the mounting structure comprises a bar, a rod, a cylinder, or combinations thereof.

3. The arc quenching system of claim 1, wherein the mounting structure comprises one or more insulating materials.

4. The arc quenching system of claim 1, wherein the motion delivery unit comprises a motor, a spring, a gear, or combinations thereof.

5. An arc quenching system, comprising:
   a mounting structure;
   a plurality of movable arc chute plates mounted on the mounting structure; and
   a housing configured to enclose at least the mounting structure and the plurality of movable arc chute plates, wherein the housing comprises a window configured to channelize a pressurized gas to impart at least one of a rotation motion or a vibration motion to one or more movable arc chute plates of the plurality of movable arc chute plates.

6. The arc quenching system of claim 5, wherein at least one end of the mounting structure is movably supported by the housing.

7. The arc quenching system of claim 5, wherein one or more movable arc chute plates of the plurality of movable arc chute plates comprise one or more protrusions.

8. The arc quenching system of claim 5, wherein at least one movable arc chute plate of the plurality of movable arc chute plates is configured to rotate in a clockwise direction and other movable arc chute plates of the plurality of movable arc chutes are configured to rotate in an anticlockwise direction.

9. A circuit breaker, comprising:
   a fixed contact;
   a moving contact detachably coupled to the fixed contact; and
   an arc quenching system comprising a plurality of movable arc chute plates arranged proximate to the fixed contact and the moving contact, wherein one or more movable arc chute plates of the plurality of movable arc chute plates are configured to rotate, vibrate, or both, in response the generation of an arc to facilitate quenching of the arc.

10. The circuit breaker of claim 9, further comprising a lever coupled to the moving contact, wherein the lever is in a first position when the moving contact is coupled to the fixed contact, and the lever is transitioned to a second position when the moving contact is decoupled from the fixed contact.

11. The circuit breaker of claim 9, further comprising a current sensing unit configured to detect a current flowing through an electrical path.

12. The circuit breaker of claim 11, wherein the current sensing unit comprises at least one of a solenoid, a current transformer, and a Rogowski coil.

13. The circuit breaker of claim 11, further comprising a control unit configured to:
   detect an over-current condition based on the detected current flowing in the electrical path; and
   generate a control signal representative of the over-current condition.

14. The circuit breaker of claim 13, further comprising an actuator unit configured to:
   receive the control signal; and
   separate the moving contact from the fixed contact in response to receipt of the control signal.

15. The circuit breaker of claim 9, wherein the arc quenching system further comprises a mounting structure for mounting the plurality of movable arc chute plates thereon.

16. The circuit breaker of claim 15, wherein the arc quenching system further comprises a motion delivery unit coupled to the mounting structure and configured to impart at least one of a rotation motion and a vibration motion to the plurality of movable arc chute plates.

17. The circuit breaker of claim 16, wherein the motion delivery unit comprises a motor, a spring, a gear, or combinations thereof.

18. The circuit breaker of claim 9, further comprising a housing configured to enclose at least the plurality of movable arc chute plates.

19. A method for quenching an arc in a circuit breaker connected in an electrical path, the circuit breaker comprising a moving contact detachably coupled to a fixed contact, the method comprising:
   determining one or more fault conditions in the electrical path;
   enabling a separation of the moving contact from the fixed contact in response to the determination of the one or more fault conditions; and
   imparting a rotation motion, a vibration motion, or both to one or more movable arc chute plates of a plurality of movable arc chute plates upon separation of the moving contact from the fixed contact to quench the arc.

20. The method of claim 19, wherein enabling the separation of the moving contact from the fixed contact comprises:
   generating a control signal in response to the detection of the one or more fault conditions; and
   communicating the control signal to an actuator unit.

21. The method of claim 20, wherein imparting the rotation motion, the vibration motion, or both to the one or more movable arc chute plates of the plurality of movable arc chute plates comprises delivering the rotation motion, the vibration motion, or both to the one or more movable arc chute plates of the plurality of movable arc chute plates via a motion delivery unit in response to the control signal indicative of the occurrence of the one or more fault conditions.

22. The method of claim 19, wherein imparting the rotation motion, the vibration motion, or both to the one or more movable arc chute plates of the plurality of movable arc chute plates comprises delivering the rotation motion, the vibration motion, or both to the one or more movable arc chute plates of the plurality of movable arc chute plates via a flow of a pressurized gas through a window formed in an housing of the circuit breaker, and wherein the pressurized gas is generated due an occurrence of the arc.

* * * * *